(12) United States Patent
Baumgard et al.

(10) Patent No.: US 7,444,815 B2
(45) Date of Patent: Nov. 4, 2008

(54) EGR SYSTEM FOR HIGH EGR RATES

(75) Inventors: Kirby Jon Baumgard, Cedar Falls, IA (US); Richard Edward Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 49 days.

(21) Appl. No.: 11/298,881

(22) Filed: Dec. 9, 2005

(65) Prior Publication Data

US 2007/0130947 A1    Jun. 14, 2007

(51) Int. Cl.
*F02B 33/44* (2006.01)
(52) U.S. Cl. ........................ 60/605.2; 60/612
(58) Field of Classification Search ................ 60/605.2, 60/612
See application file for complete search history.

(56) References Cited

U.S. PATENT DOCUMENTS

| | | | | |
|---|---|---|---|---|
| 4,722,315 A * | 2/1988 | Pickel | ................... | 123/568.14 |
| 5,517,976 A * | 5/1996 | Bachle et al. | .......... | 123/568.11 |
| 5,611,203 A * | 3/1997 | Henderson et al. | ......... | 60/605.2 |
| 5,746,189 A * | 5/1998 | Kuzuya et al. | ......... | 123/568.15 |
| 6,009,709 A * | 1/2000 | Bailey | ........................ | 60/605.2 |
| 6,347,619 B1 * | 2/2002 | Whiting et al. | ......... | 123/568.12 |
| 6,360,732 B1 * | 3/2002 | Bailey et al. | ............ | 123/568.12 |
| 6,397,598 B1 * | 6/2002 | Pierpont | ....................... | 60/612 |
| 6,484,500 B1 * | 11/2002 | Coleman et al. | .............. | 60/612 |
| 6,742,506 B1 * | 6/2004 | Grandin | .................. | 123/568.12 |
| 6,772,742 B2 * | 8/2004 | Lei et al. | ................ | 123/568.14 |
| 6,789,531 B1 * | 9/2004 | Remmels | ................ | 123/568.11 |
| 6,935,319 B2 * | 8/2005 | Aupperle et al. | ........ | 123/568.12 |
| 2003/0056498 A1 * | 3/2003 | Kuenstler et al. | .............. | 60/286 |
| 2006/0101819 A1 * | 5/2006 | Schorn et al. | .................. | 60/602 |

* cited by examiner

*Primary Examiner*—Thomas Denion
*Assistant Examiner*—Mary A Davis

(57) ABSTRACT

An internal combustion engine includes a first set of combustion cylinders and a second set of combustion cylinders. A first exhaust manifold is associated with the first set of combustion cylinders, and a second exhaust manifold is associated with the second set of combustion cylinders. A turbocharger includes a turbine which is fluidly coupled exclusively with the first exhaust manifold. An EGR system fluidly interconnects the second exhaust manifold and an intake manifold.

8 Claims, 1 Drawing Sheet

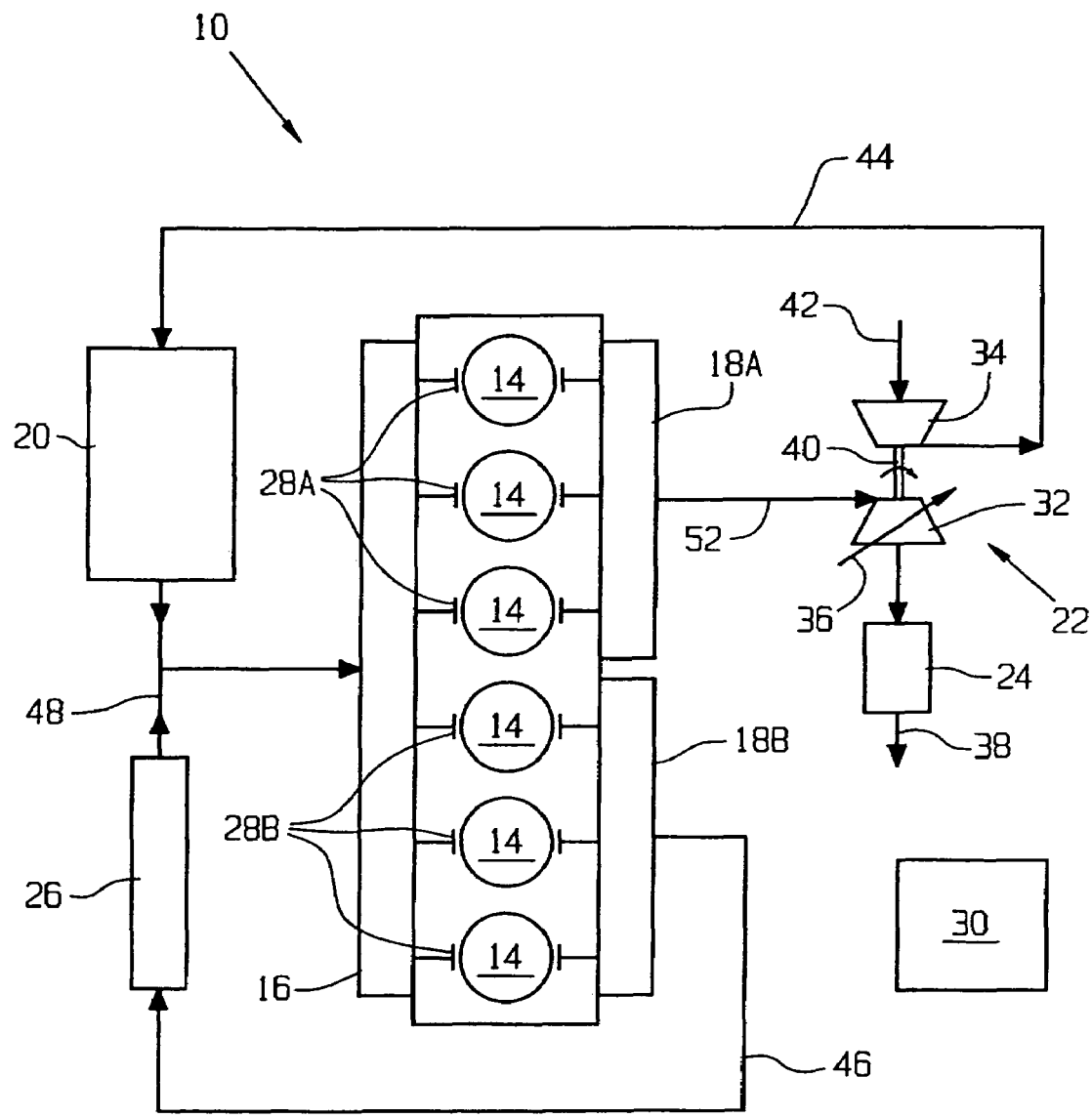

EGR SYSTEM FOR HIGH EGR RATES

FIELD OF THE INVENTION

The present invention relates to internal combustion engines, and, more particularly, to EGR systems used with internal combustion engines.

BACKGROUND OF THE INVENTION

An internal combustion (IC) engine may include an exhaust gas recirculation (EGR) system for controlling the generation of undesirable pollutant gases and particulate matter in the operation of IC engines. EGR systems primarily recirculate the exhaust gas by-products into the intake air supply of the IC engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the IC engine.

An IC engine may also include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

When utilizing EGR in a turbocharged diesel engine, the IC engine may use two exhaust manifolds with output flows which are joined together through a common fluid line which is coupled with the input to the turbine. The exhaust gas to be recirculated is preferably removed upstream of the exhaust gas driven turbine associated with the turbocharger. The percentage of the total exhaust flow which is diverted for introduction into the intake manifold of an internal combustion engine is known as the EGR rate of the engine, usually at an approximately 5 to 25% EGR rate.

What is needed in the art is an EGR system having a high EGR rate of approximately 50% of the total exhaust flow from the exhaust manifolds.

SUMMARY OF THE INVENTION

The invention comprises, in one form thereof, an internal combustion engine, including a first set of combustion cylinders and a second set of combustion cylinders. A first exhaust manifold is associated with the first set of combustion cylinders, and a second exhaust manifold is associated with the second set of combustion cylinders. A turbocharger includes a turbine which is fluidly coupled exclusively with the first exhaust manifold. An EGR system fluidly interconnects the second exhaust manifold and an intake manifold.

The invention comprises, in another form thereof, a method of operating an internal combustion engine, including the steps of: driving a turbocharger using exhaust gas exclusively from a first set of combustion cylinders; and operating an EGR system using exhaust gas exclusively from a second set of combustion cylinders.

BRIEF DESCRIPTION OF THE DRAWINGS

FIG. 1 is a schematic illustration of an embodiment of an internal combustion engine including an EGR system of the present invention.

DETAILED DESCRIPTION OF THE INVENTION

Referring now to FIG. 1, there is shown an embodiment of an IC engine 10 of the present invention, which generally includes a block 12 having a plurality of combustion cylinders 14, intake manifold 16, first exhaust manifold 18A, second exhaust manifold 18B, charge air cooler 20, turbocharger 22, particulate filter 24 and EGR cooler 26. In the embodiment shown, IC engine 10 is a diesel engine which is incorporated into a work machine, such as an agricultural tractor or combine, but may be differently configured, depending upon the application.

Block 12 is typically a cast metal block which is formed to define combustion cylinders 14. In the embodiment shown, block 12 includes six combustion cylinders 14, but may include a different number depending upon the application. Intake manifold 16 and exhaust manifolds 18A and 18B are also typically formed from cast metal, and are coupled with block 12 in conventional manner, such as by using bolts and gaskets. Intake manifold 16 and exhaust manifolds 18A and 18B are each in fluid communication with combustion cylinders 14. Intake manifold 16 receives charge air from charge air cooler 20 and supplies charge air (which may be air or a fuel/air mixture) to combustion cylinders 14, such as by using intake valves 28A associated with a first set of combustion cylinders (the top 3) shown in FIG. 1, and intake valves 28B associated with a second set of combustion cylinders (the bottom 3) shown in FIG. 1. The timing of intake valves 28A and 28B may be adjusted using a controller 30.

Exhaust manifold 18A is in fluid communication with the first set of combustion cylinders 14, and discharges exhaust gas to turbocharger 22. Exhaust manifold 18B is in fluid communication with the second set of combustion cylinders 14, and discharges EGR gas to EGR cooler 26 and intake manifold 16.

Turbocharger 22 includes a variable geometry turbine (VGT) 32 and a compressor 34. VGT 32 is adjustably controllable as indicated by line 36, and includes an actuatable element which is controlled electronically using controller 30. For example, VGT 32 may be actuated by changing the position of turbine blades, a variable size orifice, or other actuatable elements. The turbine within VGT 32 is driven by exhaust gas from exhaust manifold 18A, and is exhausted to particulate filter 24 and the ambient environment, as indicated by arrow 38.

VGT 32 mechanically drives compressor 34 through a rotatable shaft 40. Compressor 34 is a fixed geometry compressor in the embodiment shown. Compressor 34 receives combustion air from the ambient environment as indicated by line 42, and discharges the compressed combustion air via line 44 to charge air cooler 20. As a result of the mechanical work through the compression of the combustion air, the heated charge air is cooled in charge air cooler 20 prior to being introduced to intake manifold 16.

An EGR system includes a first fluid line 46, EGR cooler 26, and second fluid line 48. The term fluid line, as used herein, is intended broadly to cover a conduit for transporting a gas such as exhaust gas and/or combustion air. Exhaust gas from second fluid line 48 is at a pressure higher than charge air from charge air cooler 20, and mixes with the charge air from charge air cooler 20 prior to entering intake manifold 16. Of course, second fluid line 48 may terminate at a second inlet port directly into intake manifold 16.

During operation, exhaust gas which is discharged from first exhaust manifold 18A drives VGT 32 of turbocharger 22. Compressor 34 receives ambient air and discharges compressed charge air to charge air cooler 20, where it is cooled prior to introduction at intake manifold 16. Exhaust gas which is discharged from second exhaust manifold 18B is cooled in EGR cooler 26, and mixed with the charge air from charge air cooler 20. Since first exhaust manifold 18A and second exhaust manifold 18B each receive exhaust gas from 3 combustion cylinders, the EGR rate of IC engine 10 is approximately 50%.

To adjust the EGR rate, the timing of intake valves 28A and/or 28B can be adjusted to change the volumetric efficiency of the first set of combustion cylinders associated with first exhaust manifold 18A and/or the second set of combustion cylinders associated with second exhaust manifold 18B. For example, the closing of intake valves 28A and/or 28B can be delayed to decrease the volumetric efficiency of the corresponding set of combustion cylinders.

Alternatively, the EGR rate can be adjusted by leaning out or making rich the air to fuel ratio in the first set of combustion cylinders 14 associated with first exhaust manifold 18A and/or the second set of combustion cylinders 14 associated with second exhaust manifold 18B.

Having described the preferred embodiment, it will become apparent that various modifications can be made without departing from the scope of the invention as defined in the accompanying claims.

The invention claimed is:

1. An internal combustion engine, comprising:
   a first set of combustion cylinders;
   a first exhaust manifold associated with said first set of combustion cylinders;
   a second set of combustion cylinders;
   a second exhaust manifold associated with said second set of combustion cylinders;
   a turbocharger including a turbine fluidly coupled with said first exhaust manifold, said turbine being exhausted to ambient without fluid interconnection with said second exhaust manifold;
   an intake manifold common to said first and second set of cylinders; and
   an EGR system fluidly interconnecting said second exhaust manifold and said common intake manifold;
   including a first set of intake valves associated with said first set of combustion cylinders, a second set of intake valves associated with said second set of combustion cylinders, and a controller independently controlling a timing of said first set of intake valves relative to a timing of said second set of intake valves, thereby effecting a desired EGR rate through said EGR system.

2. An internal combustion engine, comprising:
   a first set of combustion cylinders;
   a first exhaust manifold associated with said first set of combustion cylinders;
   a second set of combustion cylinders;
   a second exhaust manifold associated with said second set of combustion cylinders;
   a turbocharger including a turbine in fluid communication with said first exhaust manifold and not in fluid communication with said second exhaust manifold;
   an intake manifold common to said first and second set of combustion cylinders in fluid communication with said second exhaust manifold and not in fluid communication with said first exhaust manifold; and
   a first set of intake valves associated with said first set of combustion cylinders, a second set of intake valves associated with said second set of combustion cylinders, and a controller independently controlling a timing of said first set of intake valves relative to a timing of said second set of intake valves, thereby effecting a desired EGR rate between said second exhaust manifold and said common intake manifold.

3. The internal combustion engine of claim 2, including an EGR cooler fluidly interconnecting said second exhaust manifold and said intake manifold.

4. The internal combustion engine of claim 3, wherein said turbocharger includes a compressor having a discharge, and including a charge air cooler coupled with said compressor discharge, said EGR cooler coupled with a discharge from said charge air cooler.

5. The internal combustion engine of claim 4, wherein said charge air cooler comprises an air-to-air intercooler.

6. The internal combustion engine of claim 2, wherein said turbine includes a variable geometry turbine.

7. The internal combustion engine of claim 6, including a particulate filter coupled with a discharge from said variable geometry turbine.

8. The internal combustion engine of claim 2, wherein said first set of combustion cylinders and said second set of combustion cylinders are equal in number.

* * * * *